United States Patent
Okamoto et al.

(10) Patent No.: US 6,711,119 B1
(45) Date of Patent: Mar. 23, 2004

(54) DISK CARTRIDGE WITH A HOLDER HAVING DISK INFORMATION ON IT

(75) Inventors: Tomomi Okamoto, Chigasaki (JP); Kyuichiro Nagai, Fujisawa (JP); Hirofumi Taguchi, Yokohama (JP); Hiroaki Ono, Fujisawa (JP); Atsushi Inoue, Chigasaki (JP); Nobuo Masuoka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/456,422

(22) Filed: Dec. 8, 1999

Related U.S. Application Data

(63) Continuation of application No. 09/233,205, filed on Jan. 19, 1999, now Pat. No. 6,349,087.

(30) Foreign Application Priority Data

| Jan. 21, 1998 | (JP) | 10-009281 |
| Feb. 13, 1998 | (JP) | 10-030841 |
| Mar. 5, 1998 | (JP) | 10-053097 |

(51) Int. Cl.⁷ ............................................. G11B 23/03
(52) U.S. Cl. ................................................. 369/291
(58) Field of Search ............................ 369/291, 289; 360/132, 133; 206/308.1, 308.2, 308.3

(56) References Cited

U.S. PATENT DOCUMENTS

| 4,159,827 A | * | 7/1979 | Torrington ................... 274/9 |
| 4,463,850 A | * | 8/1984 | Gorog ....................... 206/309 |
| 4,849,958 A | * | 7/1989 | Douwes et al. ............. 369/77.2 |
| 4,928,271 A | * | 5/1990 | Verhagen ................... 369/292 |
| 4,980,883 A | * | 12/1990 | Mutou et al. ............... 369/291 |
| 5,062,100 A | * | 10/1991 | Verhoeven et al. ......... 369/291 |
| 5,208,802 A | * | 5/1993 | Suzuki et al. ............... 369/289 |
| 5,499,233 A | * | 3/1996 | Childers et al. ............ 369/291 |
| 5,537,389 A | * | 7/1996 | Kuwa et al. ................ 369/291 |
| 5,841,605 A | * | 11/1998 | Foster et al. ............. 360/97.01 |
| 5,923,630 A | * | 7/1999 | Yoshida et al. ............. 369/77.2 |
| 5,936,935 A | * | 8/1999 | Hanakawa et al. ......... 369/291 |
| 5,940,255 A | * | 8/1999 | Uwabo et al. .............. 360/133 |
| 6,044,058 A | * | 3/2000 | Miyazaki et al. ........... 369/291 |
| 6,067,214 A | * | 5/2000 | Thomas, III ............... 360/133 |
| 6,172,962 B1 | * | 1/2001 | Goto et al. ................. 369/291 |
| 6,201,662 B1 | * | 3/2001 | Graves et al. .............. 360/133 |
| 6,205,114 B1 | * | 3/2001 | Takekoh et al. ............ 360/133 |
| 6,205,115 B1 | * | 3/2001 | Ikebe et al. ................ 369/291 |
| 6,239,950 B1 | * | 5/2001 | Uwabo et al. .............. 360/133 |

FOREIGN PATENT DOCUMENTS

| EP | 0784324 A1 | * | 7/1997 |
| JP | 56-74873 | | 6/1981 |
| JP | 5-89627 | * | 4/1993 |
| JP | 7-114782 | | 5/1995 |
| JP | 10-208431 | * | 8/1998 |

(List continued on next page.)

Primary Examiner—Tianjie Chen
(74) Attorney, Agent, or Firm—Antonelli, Terry, Stout & Kraus, LLP

(57) ABSTRACT

A disk is moved between disk cartridges without being in touch with the disk. Therefore, movement of the disk between the disk cartridges is carried out via a disk holder. Further, when the disk is moved between the disk cartridges, disk information of the cartridge is also moved simultaneously. Accordingly, the disk information held by the disk cartridge is provided at a disk holder portion and the disk information can be read by other disk device. Further, the disk holder is provided with a region representing information of the disk. When it is made to be a label region, in moving the disk between the disk cartridges, also the disk information held by the disk holder can simultaneously be moved. Further, even when the disk cartridge incorporates the disk, the content of the disk can easily be recognized via the disk holder. Further, a user can arbitrarily write or erase content of the disk to or from the label region, the disk is recognized easily and easiness of use is considerably promoted.

6 Claims, 20 Drawing Sheets

FOREIGN PATENT DOCUMENTS

| | | | |
|---|---|---|---|
| JP | 10-247369 | * | 9/1998 |
| JP | 11-66795 | * | 3/1999 |
| JP | 11-86487 | | 3/1999 |
| JP | 2000-11574 | * | 1/2000 |
| JP | 2000-40325 | * | 2/2000 |
| JP | 2000-40327 | * | 2/2000 |
| JP | 2000-40329 | * | 2/2000 |
| JP | 2000-182348 | * | 6/2000 |
| JP | 2000-260151 | * | 9/2000 |
| JP | 2001-60375 | * | 3/2001 |

* cited by examiner

FIG. 10A
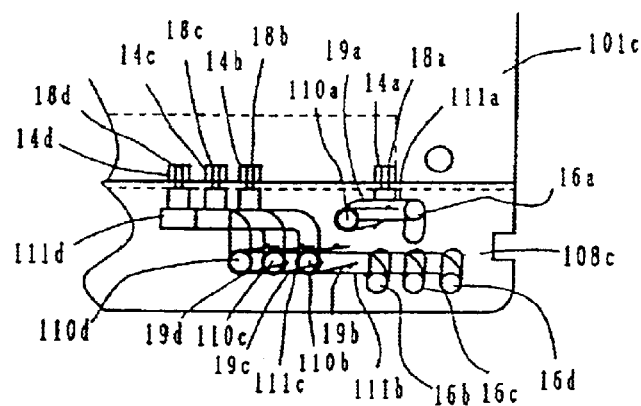
FIG. 10B
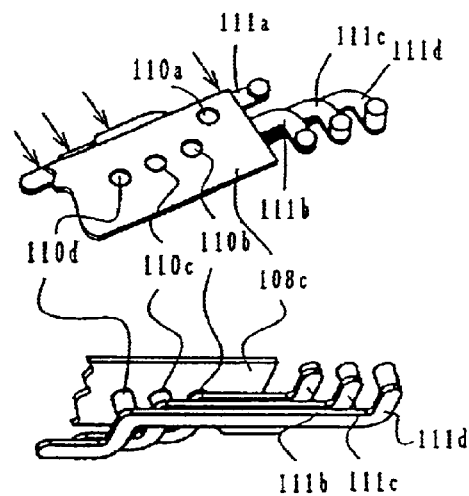
FIG. 10C

Section E-E

Section F-F

DISK CARTRIDGE WITH A HOLDER HAVING DISK INFORMATION ON IT

CROSS REFERENCE TO RELATED APPLICATION

This is a continuation of U.S. application Ser. No. 09/233,205, filed Jan. 19, 1999, now U.S. Pat. No. 6,349,087 B1 the subject matter of which is incorporated by reference herein.

BACKGROUND OF THE INVENTION

The present invention relates to a disk cartridge incorporating a disk-shaped recording medium such as an optical disk, a magneto-optical disk or the like.

Conventionally, a disk such as an optical disk or the like is used in a disk-shaped recording medium. These disks are frequently used by being incorporated in a disk cartridge to prevent recording/reproducing error from causing by adhesion of dust and dirt or the like to a record face.

In the meantime, according to a disk-shaped recording medium, when the record density remains the same, naturally, the larger the diameter, the larger the record capacity. Meanwhile, when a disk-shaped recording medium mentioned above is used as a recording medium of a portable recording/reproducing device, for example, a video camera or the like, a small-sized disk is excellent in portability. Therefore, disks having different sizes may be used for a disk of a portable device and a disk of a stationary device. In this case, a small-sized one is naturally used for a disk cartridge used in the portable disk. When the recording system remains the same and the size of disk differs, if the disk can be mounted to a recording/reproducing device, record/reproduction can be carried out by recording/reproducing means installed to the recording/reproducing device. Therefore, by taking only a disk from a small-sized disk cartridge and switching it to a disk cartridge having an outer configuration the same as that of a disk cartridge of a stationary device, the disk for potable use can be recorded/reproduced by a recording/reproducing apparatus for stationary use.

As a structure for taking out a disk from a disk cartridge, there is provided a method of arranging a portion capable of inserting and detaching a disk at a portion of a disk cartridge as disclosed in, for example, Japanese Unexamined Patent Publication No. JP-A-5-242626.

FIG. 20 shows a conventional structure of taking out a disk from a disk cartridge. A disk insertion and detachment port 12c is installed at a position other than a position arranged with a shutter 3c and a disk insertion and detachment port opening and closing member 8c is arranged there. Normally, according to the disk insertion and detachment port opening and closing member 8c, a locking claw 9 is fitted to a locking hole 13 installed to a disk cartridge 1c and the disk insertion and detachment port 12c is closed. In taking out a disk 4, the locking claw 9 is disengaged from the locking hole 13 and the disk insertion and detachment port opening and closing member 8c is rotated centering on a fulcrum, the disk insertion and detachment port 12c is opened and insertion and detachment of the disk 4 is carried out. In this case, the taken out disk 4 is handled by the hand and accordingly, the record face may be touched erroneously by the hand and may be contaminated thereby.

Further, the disk cartridge may be provided with information inherent to an incorporated disk. In that case, holes or notches are provided on the surface of the cartridge and information of the disk is transmitted to the device side by presence or absence of the holes or the notches. As information provided to a disk cartridge, there are, for example, information which can be switched by a user as in prevention of recording to prevent erroneous recording and information which has been determined from the start in respect of an incorporated disk as in differentiation of a disk for music from a disk for recording computer data. When the disk is moved between different cartridges, according to the conventional method, only the disk is moved and information provided to a disk cartridge mentioned above is not moved.

Further, in recent years, a disk both faces of which are used as signal faces as in DVD-ROM/RAM has been spreading. In the case of such a disk, a printed face is difficult to set on the disk and accordingly, a user is difficult to grasp later information concerning the disk, that is, what file name of data, software name, controller, date and so on are written therein. When a disk is moved between different cartridges, according to the conventional method, only the disk is moved, the disk is difficult to discern when it is taken out from the disk cartridge and a disk to be exchanged may be taken wrongly.

SUMMARY OF THE INVENTION

The present invention provides means for moving a disk without directly in touch with it when the disk is moved between disk cartridges.

That is, there is provided a moving method for moving a disk along with a disk holder as means for moving the disk without directly in touch with the disk and according to the method, a disk cartridge is constituted by a main body portion and a disk holder and when a disk is moved, the disk is held by the disk holder, the disk is moved along with the disk holder and accordingly, it is not necessary to directly touch the disk.

For this purpose, there is constructed a structure in which a disk holder is arranged to a disk cartridge and the disk holder can be detached from the disk cartridge main body. Further, the disk holder is provided with disk holding member, when the disk holder is mounted to the disk cartridge main body, the disk holding member releases holding of the disk, when the disk holder is detached from the disk cartridge main body, the disk holding member holds the disk and the disk is detached from the disk cartridge along with the disk holder. Further, when a disk is moved between different disk cartridges, the disk is moved along with the disk holder.

Further, there is constructed a structure in which disk holding member regulating portions are installed at inside of a disk cartridge and when a disk holder is attached to the disk cartridge, the disk holding member is brought into contact with the disk holding member regulating portions and are elastically deformed by which the disk holding member releases holding of the disk.

Further, there is provided a reverse insertion preventing means for preventing a disk holder from being inserted into a disk cartridge with a surface and a rear surface thereof upside down when the disk holder is attached to the disk cartridge.

As reverse insertion preventing means, the shape of a disk cartridge main body and the shape of the disk holder are formed in shapes which are not fitted to each other when the disk holder is inserted into the disk cartridge main body with the surface and the rear face upside down and as reverse insertion preventing means, shapes of the disk holding means may be made asymmetrical in respect of the left and right directions.

Further, according to the invention, when the disk is moved between different disk cartridges, disk information held by a disk cartridge can be moved along with the disk.

For that purpose, information in respect of the disk held by the disk cartridge is provided at a disk holder portion. When the disk is moved between the different disk cartridges, the disk is moved along with the disk holder. Then, the information in respect of the disk held by the disk cartridge is provided at the disk holder portion and when the disk is moved to a different disk cartridge, the disk information held by the disk holder portion can be read by a recording and/or reproducing device.

Further, an information holding portion of a recording medium is provided to a disk cartridge main body and the disk cartridge main body incorporates transmitting means for transmitting information held by a disk holder to the information holding portion of the disk cartridge main body in the case where positions of an information holding portion of the disk holder and the information holding portion of the disk cartridge main body differ from each other when the disk holder is attached to the disk cartridge main body.

Further, the information in respect of the disk of the disk holder can be detected at least from two directions.

Further, the information in respect of the disk of the disk holder is identified by presence or absence of notches at least over two faces of the disk cartridge.

Further, in the case of a disk cartridge where movement of a disk is not needed, an outer configuration shape thereof is made substantially equal to that of the above-described disk cartridge and the shape of the portion of holding the information in respect of the disk is made substantially equal thereto. Further, the disk cartridge is provided with a structure where only an opening portion equal to or smaller than the outer configuration of the disk is installed and the disk cannot be inserted into or detached from the disk cartridge by which a disk cartridge having a compatibility with the above-described disk cartridge is realized.

Further, according to the invention, a region for determining the disk information provided to the disk cartridge or a label region to which a user can arbitrarily write information can be moved when a disk is moved between different disk cartridges.

For that purpose, the region for determining disk information or the label region is provided to the disk holder. Or, there is constructed a constitution of providing a label region to which a user can arbitrarily write or erase necessary information and/or a region onto which a label can be pasted. That is, the information which the user can write and/or erase as necessary in respect of a disk is provided to a disk holder portion and even when the disk cartridge main body is changed, the information of the disk remains in the disk holder portion.

Further, the label region and/or the region on which a label is pasted is constituted to previously provide a recess portion of 0.2 mm or more such that it is not raised in contrast to a face where the region is provided even when a paper label or the like is pasted on the disk holder.

BRIEF DESCRIPTION OF THE DRAWINGS

FIGS. 10A, 10B and 10C are views showing the embodiment of the invention and views explaining disk information transmitting means installed to the disk cartridge;

DESCRIPTION OF THE PREFERRED EMBODIMENTS

Figure 1:
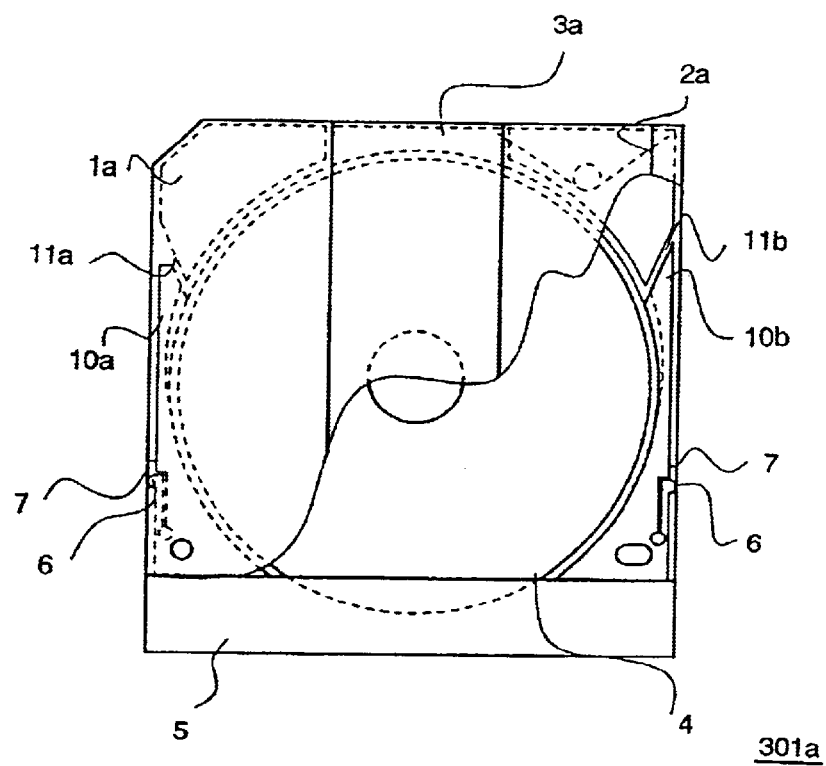
FIG. 1 is a view showing an embodiment of the present invention and is a view showing a structure of a disk cartridge.

An explanation will be given of an embodiment of the invention in reference to FIG. 1 through FIG. 4 as follows. FIG. 1 is a view explaining of the structure of a disk cartridge according to an embodiment of the invention. A disk cartridge 301a is installed with an opening portion through which a recording and/or reproducing device makes access to a disk 4 for recording and/or reproducing. A shutter 3a covers the opening portion to prevent dust and dirt or the like from adhering to the disk 4 when the disk cartridge 301a is at outside of the recording and/or reproducing device and the shutter 3a is urged in the closing direction by a shutter spring 2a. A disk holder 5 which can be detached from the disk cartridge 301a is arranged at a portion opposed to a position where the shutter 3a is arranged. In this case, a disk cartridge main body 1a is defined by a remaining constituent portion which is constituted when the disk holder 5 is detached from the disk cartridge 301a. The disk holder 5 is attached thereto by engaging together locking claws 6 with locking holes 7 and when the disk holder 5 is detached therefrom, the locking is released by detaching the locking claws 6 from the locking holes 7. The disk holder 5 is attached with holder arms 10a and 10b for holding the disk 4 and in a state in which the disk holder 5 is attached to the disk cartridge main body 1a, the holder arms 10a and 10b are brought into contact with arm regulating members 11a and 11b and are elastically deformed in a direction of releasing the holding state of the disk 4. Further, the shapes of the left holder arm 10a and the right holder arm 10b differ from each other and in this embodiment, according to the shape of the holder arm 10a, an acute angle portion at a front end of the holder arm 10b is removed. The arm regulating member ha is formed to engage with the shape. By forming the shapes of the left and right holder arms 10a and 10b in this way, in attaching the disk holder 5, insertion thereof with the surface and the rear face upside down can be prevented. That is, in the case of the embodiment, when the disk holder 5 is inserted with the surface and the rear face upside down, the front end of the holder arm 10b is brought into contact with the arm regulating member ha and the disk holder 5 cannot be completely inserted. Although according to the embodiment, reverse insertion is prevented by constituting the left and right arm holders 10a and 10b and the left and right arm regulating members 11a and 11c are asymmetrical from each other, the constitution is not limited thereto but the reverse insertion may be prevented by a method in which, for example, a protrusion or recess is installed to only one of the left and right disk holders and a shape matching the protrusion or the recess is arranged in a disk cartridge.

Figure 2:
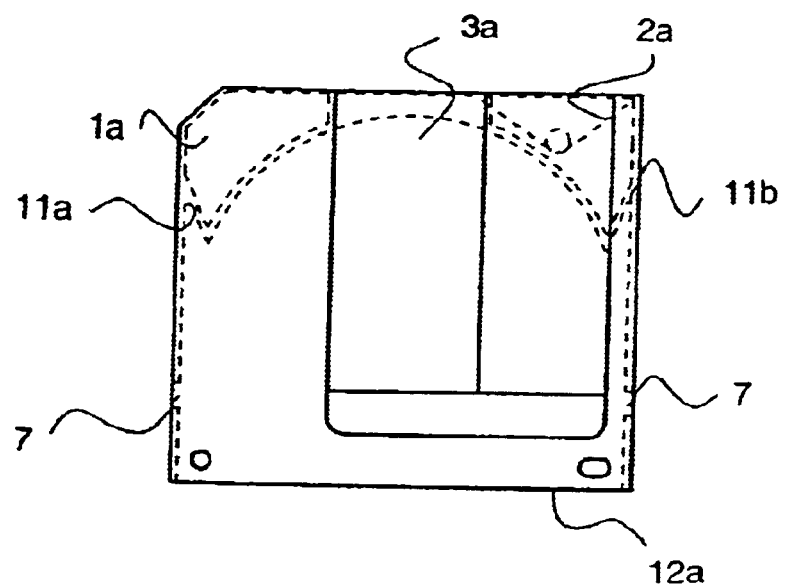
FIG. 2 is a view showing the embodiment of the invention and is a view showing a state in which a disk holder is detached from the disk cartridge.
Figure 2:
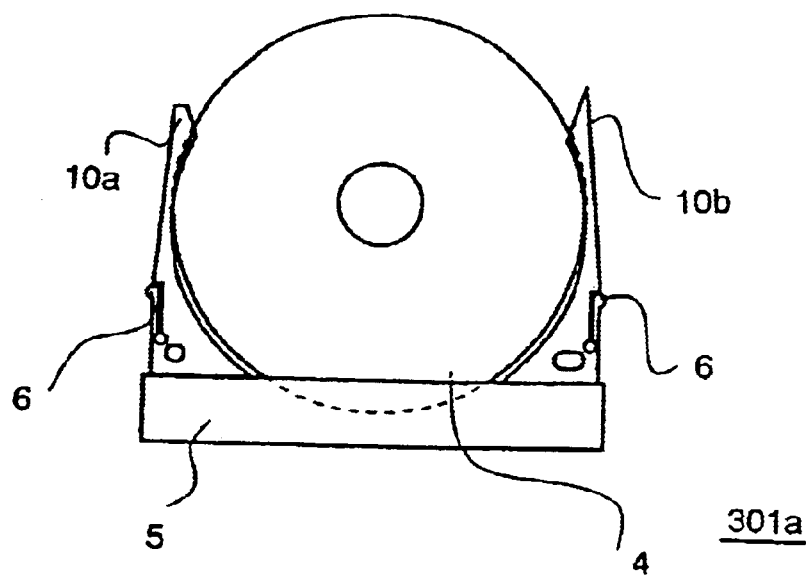

FIG. 2 shows a view in which the disk holder 5 is detached from the disk cartridge 301a according to the embodiment. As shown by the drawing, the holder arms 10a and 10b installed to the disk holder 5 are formed to hold the disk 4. Although when the disk holder 5 is attached to the disk cartridge main body 1a, the holder arms 10a and 10b are elastically deformed by the arm regulating members 11a and 11b and are released from holding the disk 4, when the disk holder 5 is detached therefrom, the holder arms 10a and 10b recover to original shapes and hold the disk 4. Thereby, when the disk holder 5 is detached, the disk holder 5 can be detached along with the disk 4. In this case, an operator does not directly touch the disk 4 and therefore, fat, oil or the like of the hand does not adhere thereto.

Figure 3:
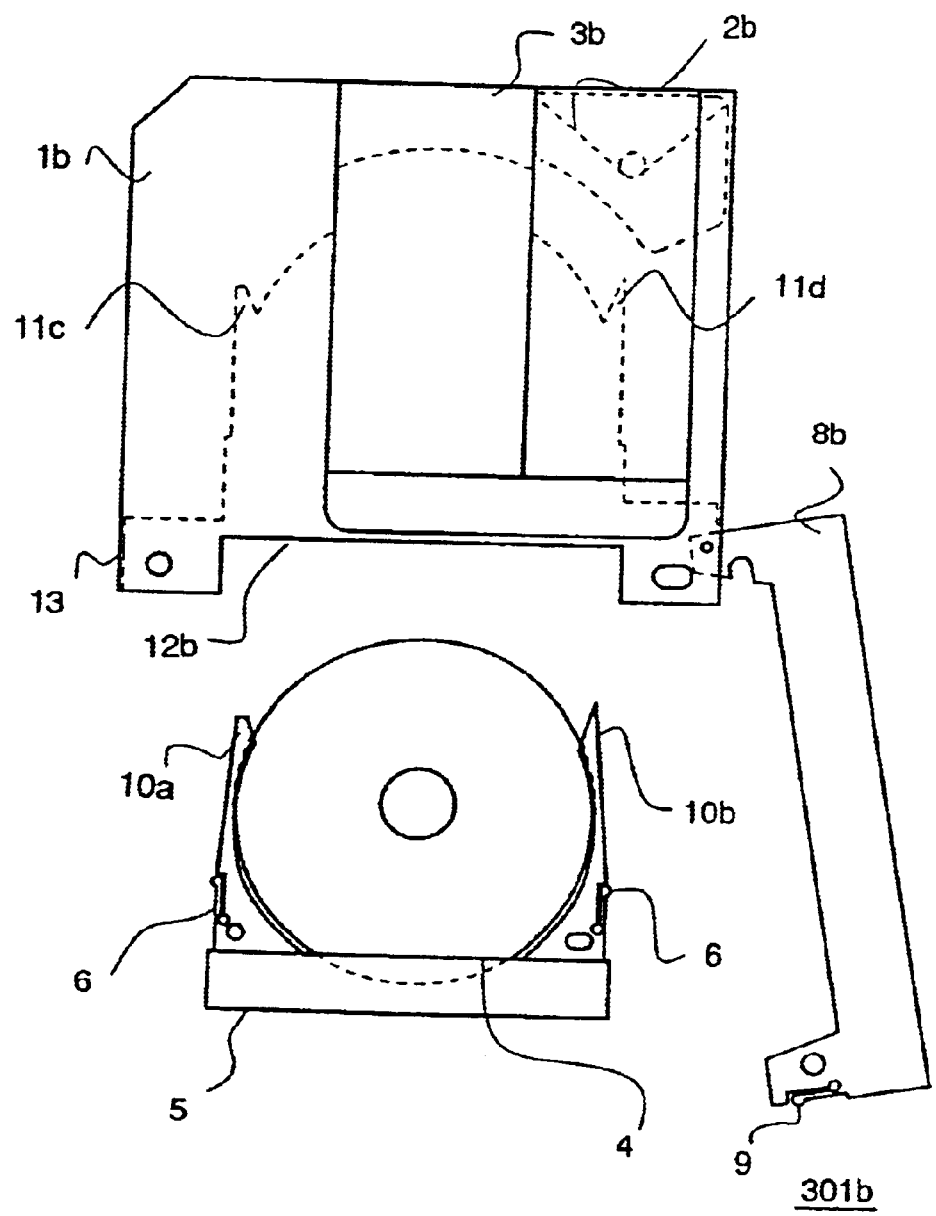
FIG. 3 is a view showing the embodiment of the invention and is a view showing a behavior of mounting the disk holder to a disk cartridge having different shape and size.
Figure 4:
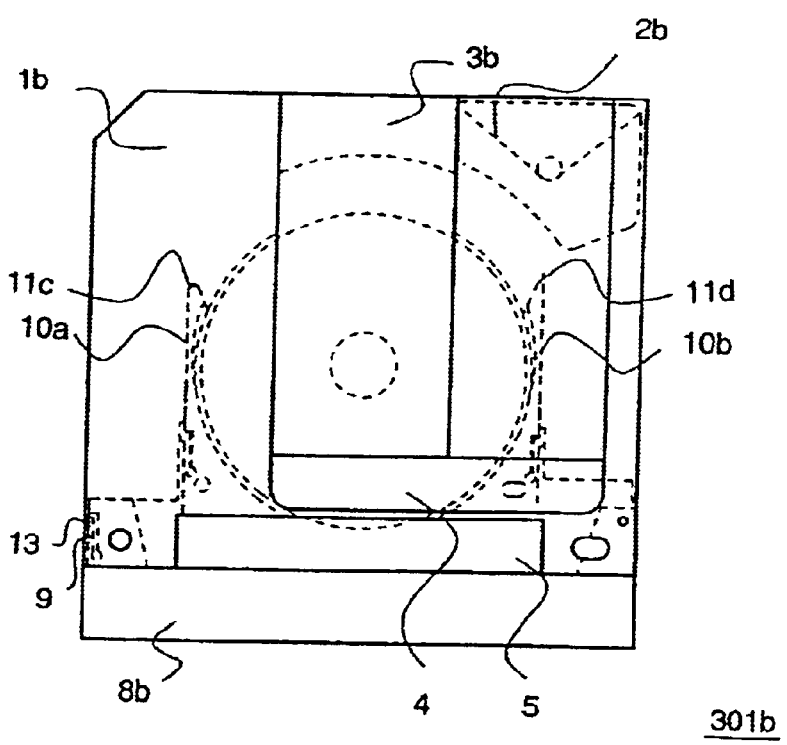
FIG. 4 is a view showing the embodiment of the invention and is a view in which the disk holder has been mounted to the disk cartridge having different shape and size.
Figure 5:
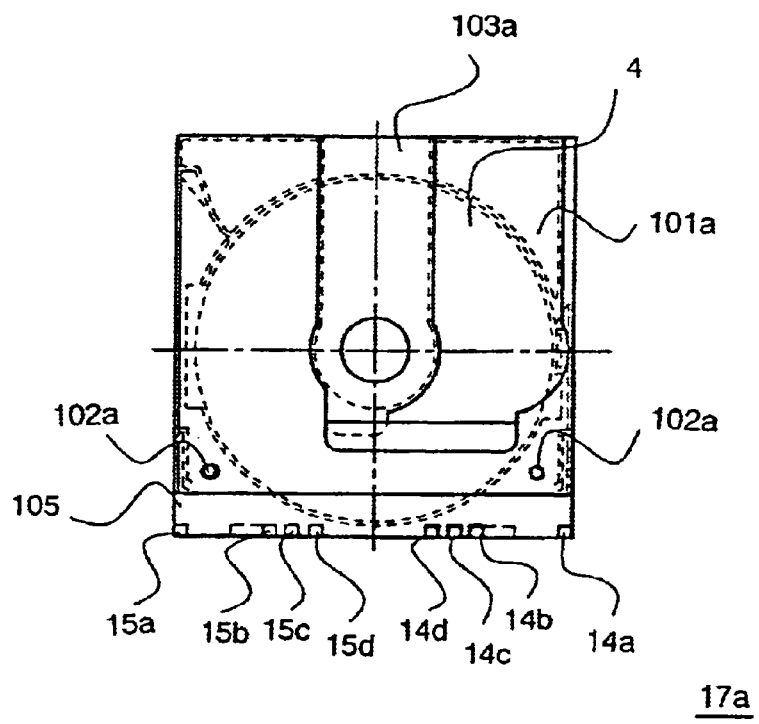
FIG. 5 is a view showing an embodiment of the invention and is a view showing the structure of a disk cartridge.

An explanation will be given of a method of moving the disk 4 held by the disk holder 5 to a disk cartridge having different shape and size in reference to FIGS. 3 and 4. FIG. 3 is a view showing a disk cartridge main body 1b having shape and size different from those of the disk cartridge 301a in correspondence with the disk holder 5 of FIG. 1. The disk cartridge main body 1b is a disk cartridge larger than the disk cartridge main body 1a. The disk cartridge main body 1b is arranged with a shutter 3b and a shutter spring 2b similar to the disk cartridge main body 1a. Further, arm regulating members 11c and 11d for elastically deforming the holder arms 10a and 10b are arranged at inside thereof. Different shapes are also constituted for left and right arm regulating members 11c and 11d for preventing reverse insertion and correspond to the shapes of the holder arms 10a and 10b. A disk insertion and detachment port 12b for inserting and detaching the disk holder 5 is provided at a portion opposed to a position in which the shutter 3b is arranged and the disk insertion and detachment port 12b can be opened and closed by a disk insertion and detachment opening and closing member 8b. The disk insertion and detachment port opening and closing member 8b is locked by engaging a locking claw 9 to a locking hole 13 and by disengaging the locking claw 9, the locking is released and the port can be opened.

The disk 4 is moved by inserting the disk holder 5 holding the disk 4 into the disk insertion and detachment port 12b and closing the disk insertion and detachment port opening and closing member 8b and by the operation the movement of the disk 4 into the disk cartridge main body 1b is completed with no direct touch with the disk 4. FIG. 4 is a view showing a disk cartridge 301b in which the disk 4 has been attached to the disk cartridge main body 1b. Similar to the disk cartridge main body 1a, the holder arms 10a and 10b are elastically deformed in a direction of releasing the holding state of the disk 4 at time point at which the disk holder 5 is inserted into the disk cartridge main body 1b.

By the above-described constitution, the disk can be moved between different cartridges with no direct touch with the disk.

Figure 11A:
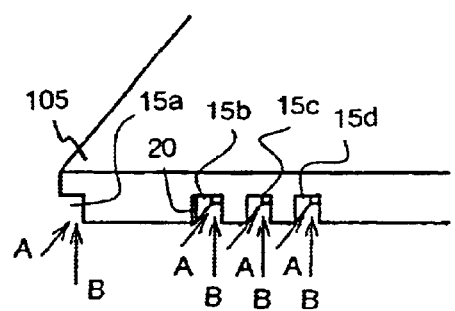
FIGS. 11A and 11B are views showing the embodiment of the invention and views showing a shape of a disk information holding portion installed to the disk holder.
Figure 11B:
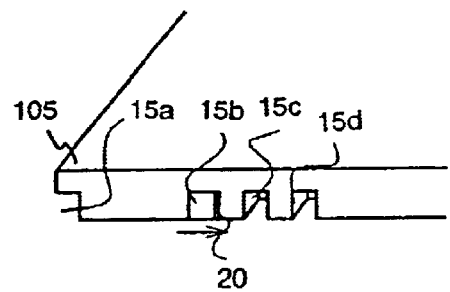

Next, an explanation will be given of successive embodiments of the invention in reference to FIG. 5 through FIG. 12. A disk holder 105 is installed with sensing areas 14a, 14b, 14c, 14d, 15a, 15b, 15c and 15d for having a recording and/or reproducing device determine information of a disk. According to the embodiment, both faces of the disk 4 can be used as a premise and each of the sensing areas 14a, 14b, 14c and 14d and the sensing areas 15a, 15b, 15c and 15d holds information of one face thereof. Accordingly, the sensing areas 14a, 14b, 14c and 14d and the sensing areas 15a, 15b, 15c and 15d are installed at positions symmetrical with each other in respect of the surface and the rear face. Further, the sensing area of the embodiment is identified by 1 bit constituted by presence or absence of a notch at the disk holder 105 as shown by FIGS. 11A and 11B. According to a disk cartridge 17a, the sensing areas are prepared at 4 locations in respect of one face and accordingly, information of 4 bits can be held. As information which can be held by the sensing areas 14a, 14b, 14c and 14d and the sensing areas 15a, 15b, 15c and 15d, there are, for example, a piece of information which can be switched by a user for prevention of recording to prevent erroneous recording and a piece of information which has already been determined from the start in respect of a disk to be incorporated as in differentiation of a disk for music use from a disk for recording computer data or differentiation of a disk in correspondence with one face from a disk in correspondence with both faces. By reading information of the sensing areas, information of the disk 4 in the disk cartridge 17a can previously be detected by a recording and/or reproducing device.

Figure 6:
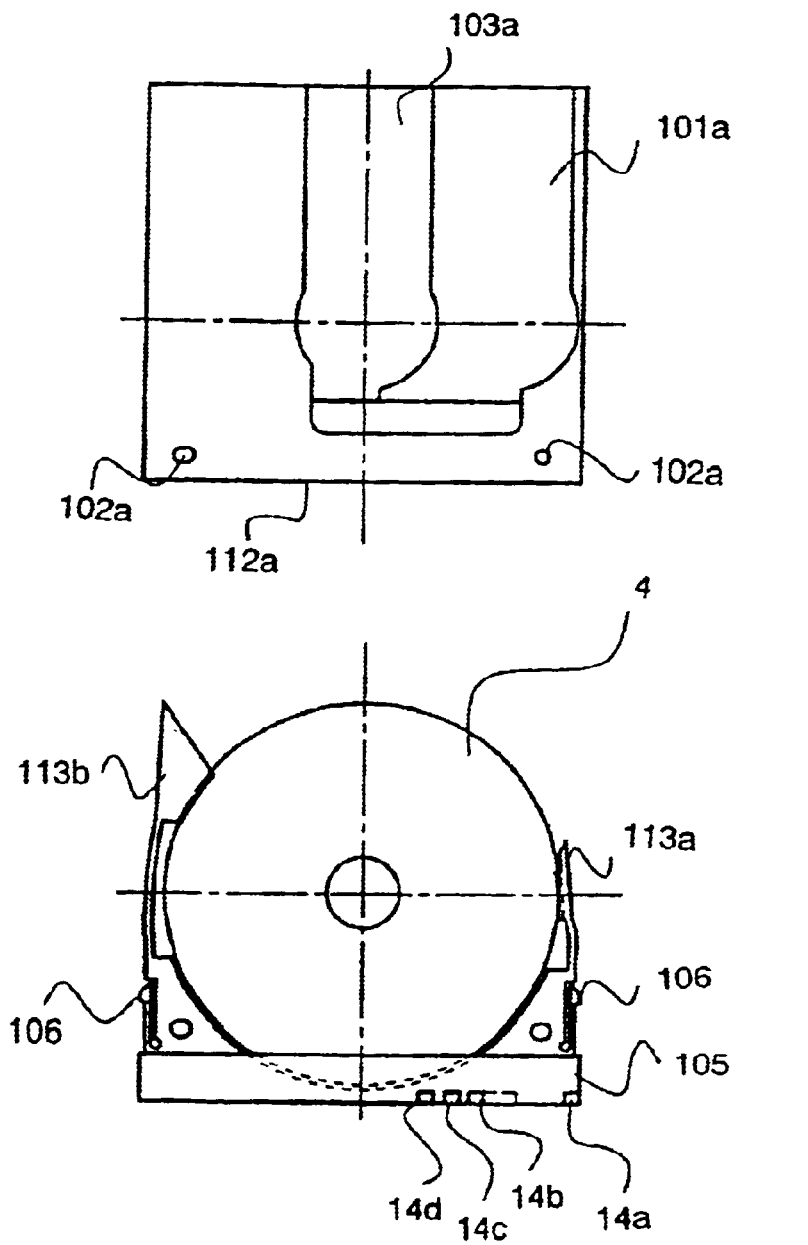
FIG. 6 is a view showing the embodiment of the invention and a view showing a state in which the disk holder is detached from the disk cartridge.
Figure 7:
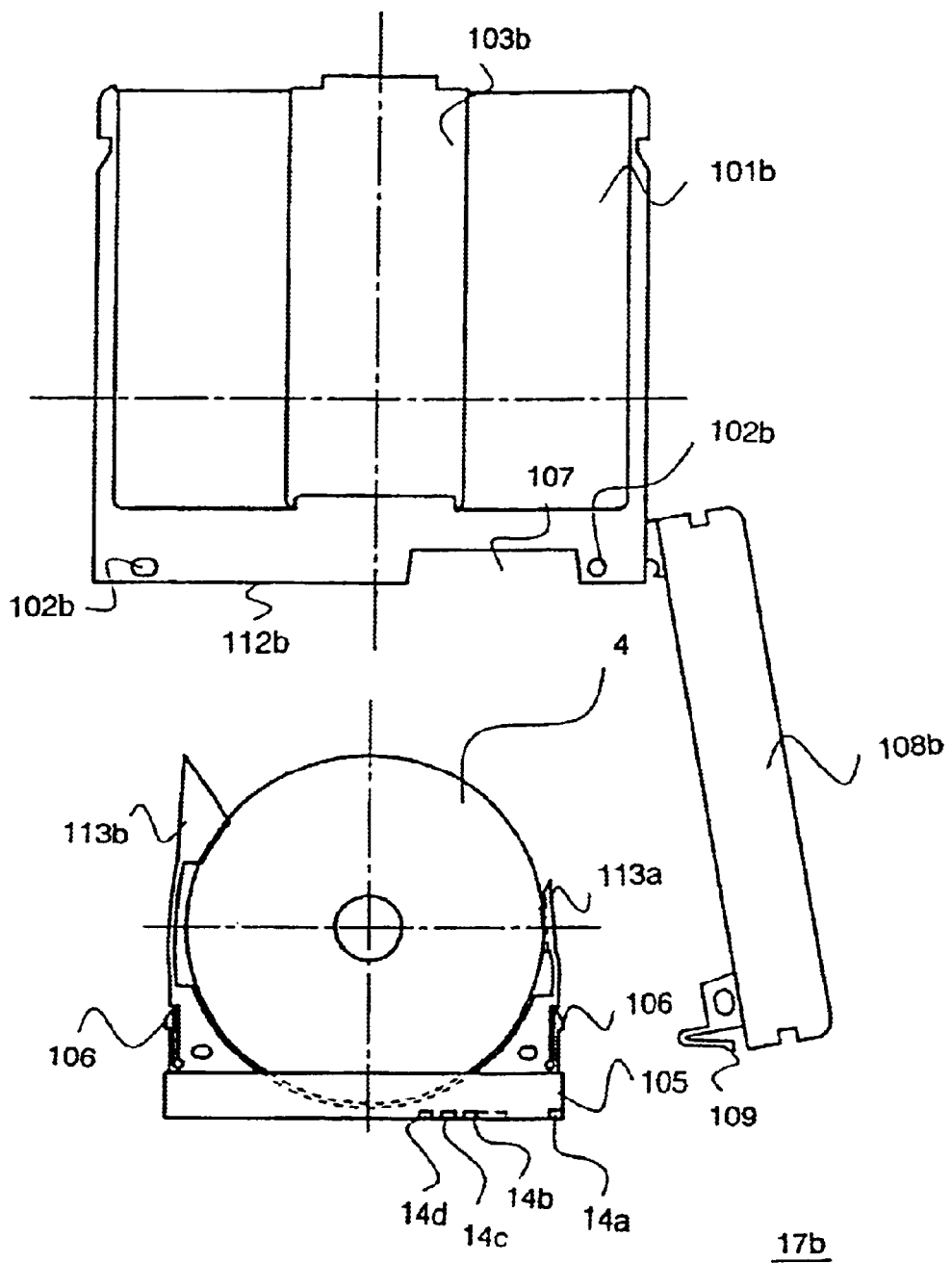
FIG. 7 is a view showing the embodiment of the invention and a view showing a behavior of mounting the disk holder to a disk cartridge having different shape and size.
Figure 8:
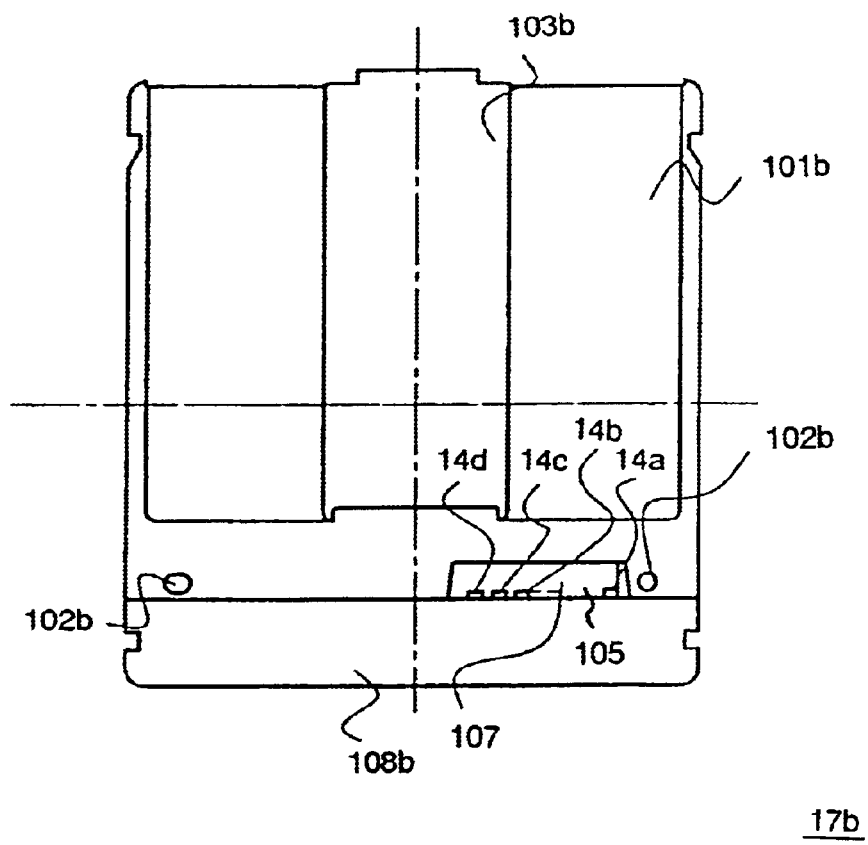
FIG. 8 is a view showing the embodiment of the invention and is a view in which the disk holder has been mounted to the disk cartridge having different shape and size.

FIG. 6 is a view in which a disk holder 105 is detached from the disk cartridge 17a. When the disk holder 105 is detached therefrom, holder arms 113a and 113b installed to the disk holder 105 hold the disk 4 and the disk 4 can also be taken out therefrom along therewith. In this case, a user does not directly touch the disk 4 and accordingly, fat, oil or the like of the hand does not adhere thereto. An explanation will be given of a behavior of attaching the disk holder 105 to other disk cartridge main body 101b in reference to FIG. 7 and FIG. 8. FIG. 7 is a view showing the shape of the disk cartridge main body 101b having shape and size different from those of a disk cartridge main body 101a of FIG. 5 to which the disk holder 105 corresponds. A notch 107 penetrated to inside of the disk cartridge is installed at the vicinity of a disk insertion and detachment port 112b. FIG. 8 is a view showing a state in which the disk 4 has been attached to the disk cartridge main body 101b. The sensing areas 14a, 14b, 14c and 14d installed to the disk holder 105 are exposed to outside of the disk cartridge via the notch 107 installed to the disk cartridge main body 101b and a recording and/or reproducing device can previously detect information of the disk 4 by reading information of the sensing areas 14a, 14b, 14c and 14d. In this way, when a disk is moved between different disk cartridges, disk information held by the disk cartridge can also be moved.

Figure 9:
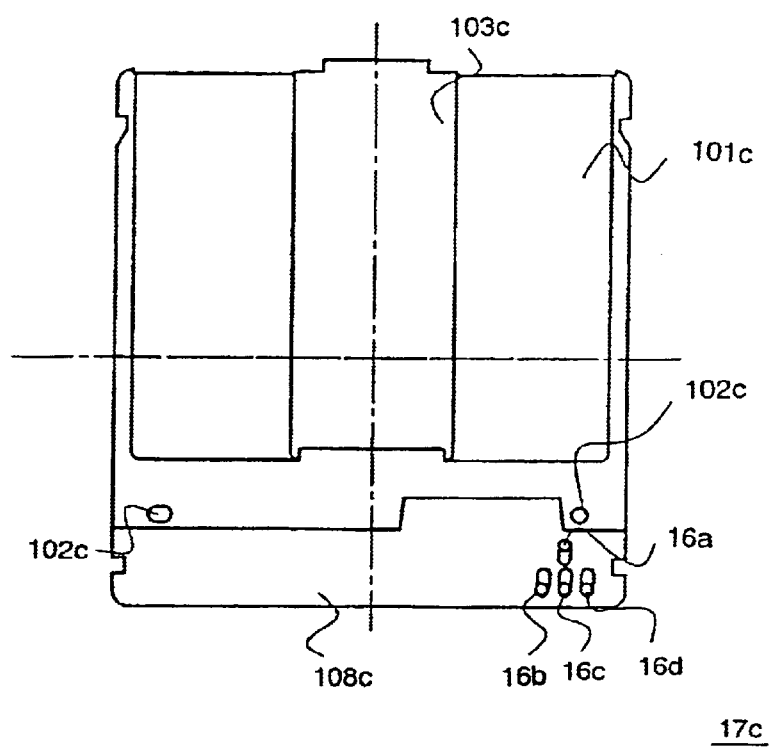
FIG. 9 is a view showing an embodiment of the invention and a view showing an outlook of a disk cartridge.

An explanation will be given of another embodiment of the invention in reference to FIG. 9 through FIG. 12. FIG. 9 shows a large-sized disk cartridge 17c similar to the disk cartridge shown by FIG. 7 in the previous embodiment. Originally, a disk having a diameter larger than that of the disk 4 shown by the previous embodiment is used in a disk cartridge having shape and size the same as those of the disk cartridge 17c. Therefore, the disk information is also provided at a portion proximate to an end of the disk cartridge to prevent interference with a large diameter disk. Therefore, disk information detecting means of a recording and/or reproducing device for use of a large-sized disk cartridge is also installed at a position in correspondence with the disk information providing portion. Hence, also in a disk cartridge main body 101c capable of exchanging disks according to the invention, sensing areas 16a, 16b, 16c and 16d holding disk information are installed at position the same as those in an original large-sized disk cartridge. The disk information of the disk holder 105 is dealt with by installing transmitting means for detecting information of the sensing areas of the disk holder 105 and transmitting the information to the sensing areas of the disk cartridge main body 101c. By the transmitting means, detecting means exclusive for the sensing areas of the disk holder 105 needs not to install at a recording and/or reproducing device.

An explanation will be given of an embodiment of disk information transmitting means in reference to FIGS. 10A, 10B and 10C and FIGS. 11A and 11B. As shown by FIGS. 11A and 11B, the disk holder 105 (shown in FIG. 7) is provided with 4 locations of the sensing areas in respect of one face thereof where 4 bits of information can be held. In detecting the sensing areas, a recording and/or reproducing device makes access from a lower face of a disk, that is, from B direction of FIG. 11A and disk information transmitting means of the disk cartridge main body 101c of FIG. 10A makes access from A direction. Accordingly, as shown by FIG. 11A, the sensing areas 15a, 15b, 15c and 15d of the disk holder 105 are identified by presence or absence of notches over 2 faces such that they can be detected from 2 directions. The notch portions may be an erroneous recording preventing portion 20 and so on for switching information later by a user as shown by FIG. 11B. In the meantime, the disk information transmitting means is constituted by sensor arms 111a, 111b, 111c and 111d, sensor pins 18a, 18b, 18c and 18d and torsional springs 19a, 19b, 19c and 19d as shown in FIGS. 10A, 10B, 10C. FIG. 10A is a penetrating view of the disk information transmitting means and FIG. 10B and FIG. 10C are perspective views showing positions of the sensor arms 111a, 111b, 111c and 111d and arm rotational centers 110a, 110b, 110c and 110d. The sensor arms 111a, 111b, 111c and 111d are rotatable respectively around the arm rotational centers 110a, 110b, 110c and 110d and are urged in one direction by the torsional springs 19a, 19b, 19c and 19d. In this case, front ends of the sensor arms 111a, 111b, 111c and 111d are disposed at positions of the sensing areas 16a, 16b, 16c and 16d. Further, the sensor arms 111a, 111b, 111c and 111d are rotated around the arm rotational centers 110a, 110b, 110c and 110d when forces are exerted at position designated by arrow marks of FIG. 10B and front ends of the sensor arms 111a, 111b, 111c and 111d are moved and accordingly, recess portions are caused at the sensing areas 16a, 16b, 16c and 16d. The sensor pins 18a, 18b, 18c and 18d are arranged respectively in correspondence with positions of the sensing areas 14a, 14b, 14c and 14d of the disk holder 105 and transmit presence or absence of notches of the sensing areas 14a, 14b, 14c and 14d of the disk holder 105 (shown in FIG. 7) to the sensor arms 111a, 111b, 111c and 111d.

Figure 12A:
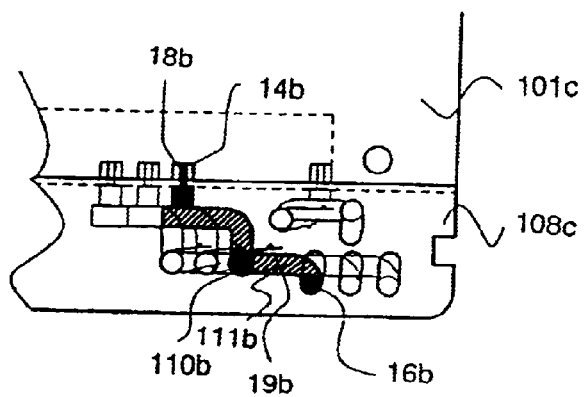
FIGS. 12A and 12B are views showing the embodiment of the invention and views explaining the operation of the disk information transmitting means installed to the disk cartridge.
Figure 12B:
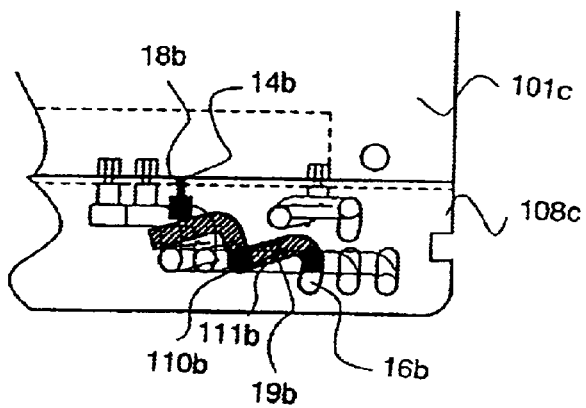

A specific explanation will be given of the operation of the disk information transmitting means in reference to FIGS. 12A and 12B. FIGS. 12A and 12B are views explaining a state of one bit of disk information. As shown by FIG. 12A, when a notch is present in the sensing area 14b of the disk holder 105 (shown in FIG. 7), the sensor pin 18b enters the notch and the sensor arm 111b is not pushed. Therefore, the sensor arm 111b is urged to an initial position by the torsional spring 19b and the sensing area 16b is closed by a front end portion of the sensor arm 111b. In the meantime, when there is no notch in the sensing area 14b of the disk holder 105 as shown by FIG. 12B, the sensor pin 18b is pushed by a wall face of the disk holder 105 and pushes the sensor arm 111b. Therefore, the sensor arm 111b is rotated around the arm rotational center 110b, the front end portion of the sensor arm 111b is moved and accordingly, a recess portion is caused at the sensing area 16b. Further, a recording and/or reproducing device detects the disk information by determining presence or absence of the recess portion of the sensing area 16b of the disk cartridge 17c.

In this way, the disk information can be transmitted from the disk holder 105 to the disk cartridge main body 101c by the disk information transmitting means.

Further, when a disk cartridge which needs not to move a disk in a recording and/or reproducing device using the disk cartridge according to the invention, by substantially equalizing an outer configuration of a disk cartridge and by using a disk cartridge having no disk holder and prescribing only sensing areas to the same shapes, a disk cartridge having compatibility in which parts such as a disk holder and the like are reduced can be realized.

By the above-described constitution, when a disk is moved between cartridges having different shapes and sizes, disk information held by a cartridge can also be moved simultaneously.

Figure 13A:
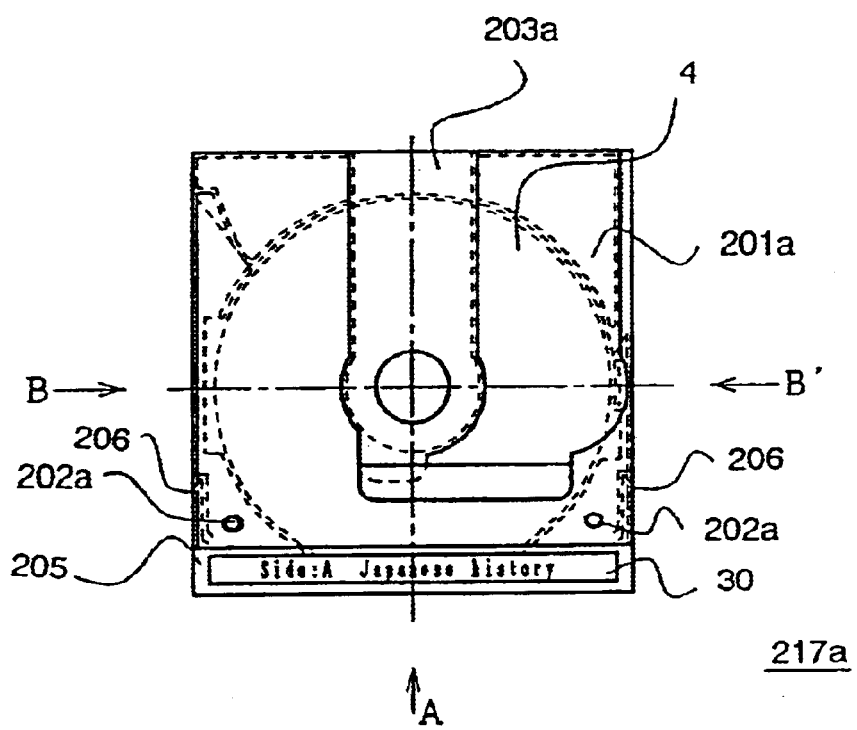
FIGS. 13A and 13B are views showing an embodiment of the invention and an upper view showing the structure of a disk cartridge and a view showing a label.
Figure 13B:

Next, an explanation will be given of successive embodiments of the invention in reference to FIGS. 13A through FIG. 19E. In this case, according to the embodiments, there is constructed a constitution in which a disk holder 205 is installed with a label region 30 to which information necessary for a disk can be written or a label 31 as shown by FIG. 13B can be formed and pasted on the label region 30 in view of achieving storage or convenience in use of the disk 4 by a user. Further, although FIG. 13A shows a case in which the label region 30 is disposed on an upper face thereof, the invention is not limited thereto but the label region 30 may be disposed on one face on the rear side of the disk holder 205 and naturally may be both faces thereof.

Figure 14:
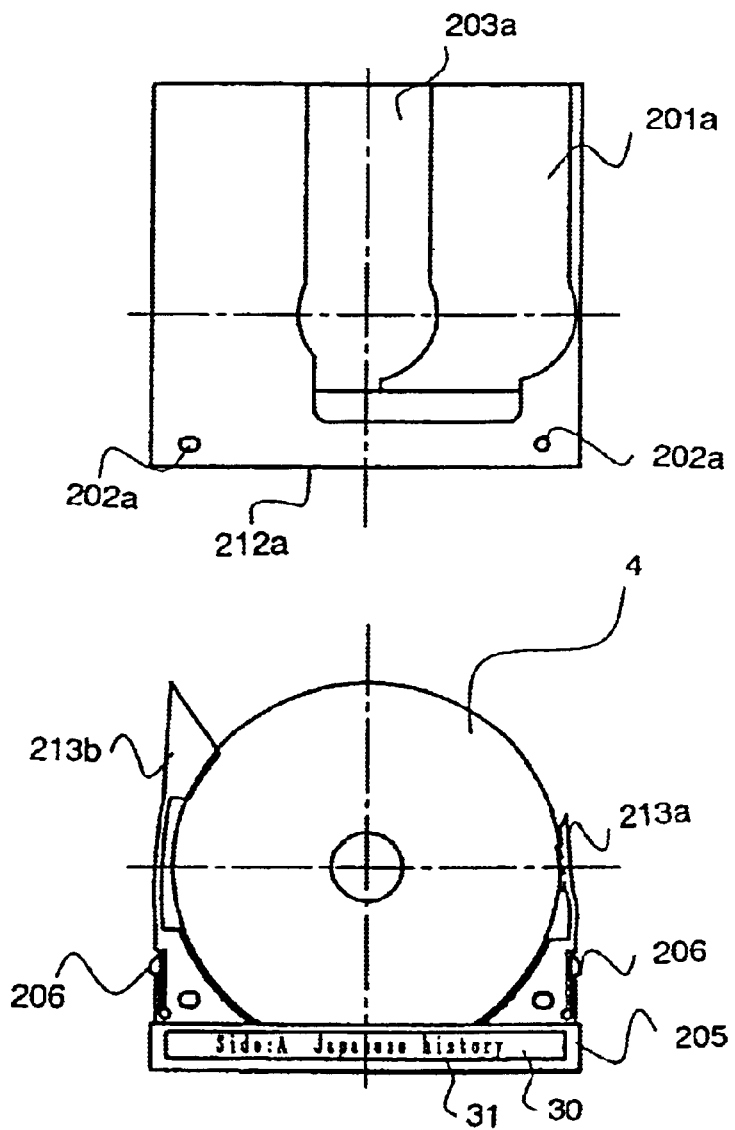
FIG. 14 is a view showing the embodiment of the invention and an upper view showing a state of detaching a disk holder from the disk cartridge.

FIG. 14 is an upper view when the disk holder 205 is detached from the disk cartridge main body 201a according to the embodiment.

Figure 15A:
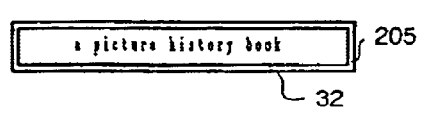
FIGS. 15A, 15B, 15C, 15D, 15E and 15F are views showing embodiments of the invention and explanatory views of a disk cartridge and label regions of the disk cartridge.
Figure 15B:
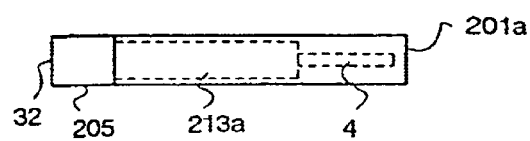

Successively, an explanation will be given of further embodiments in reference to FIGS. 15A, 15B, 15C, 15D, 15E and 15F. FIG. 15A is a view viewing a disk cartridge 217a of FIG. 13 in an arrow mark A direction and FIG. 15B is a view viewing the disk cartridge 217a of FIG. 13 in an arrow mark B' direction, respectively.

Although in the previous embodiment, a description has been given of a case in which the label region 30 is used on the upper face of the disk holder 205, according to the embodiment, as shown by FIG. 15A, there is shown a case in which a label region 32 is provided on the front face of the disk holder 205. Also in this method, information of the disk can easily be determined by the user.

Further, an explanation will be given of further embodiments in reference to FIG. 15C, FIG. 15D and FIG. 15E.

Figure 15C:
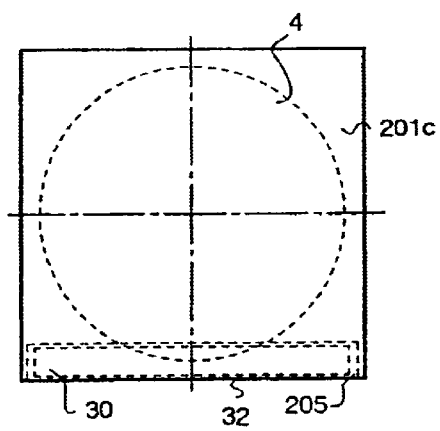
Figure 15D:
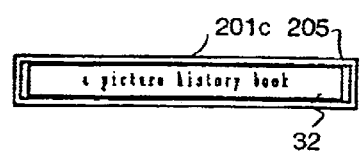
Figure 15E:
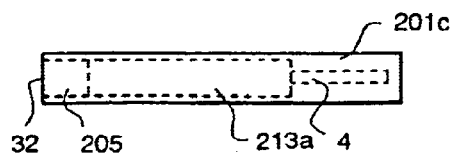

FIG. 15C shows an upper view of a disk cartridge according to the invention, FIG. 15D shows a front view thereof and FIG. 15E shows a side view thereof, respectively. Further, in FIG. 15C, a shutter and holder arms are omitted for simplification. In FIGS. 15C, 15D and 15E, numeral 4 designates the disk, numeral 205 designates the disk holder and notation 201c designates a disk cartridge main body which is different from the disk cartridge main body 201a shown by FIG. 13 in a state in which the disk holder 205 is locked by the disk cartridge main body 201c, respectively. According to the disk cartridge of the invention, in a state in which the disk holder 205 is locked by the disk cartridge main body 201c, the upper face and the side faces of the disk holder 205 are covered by the disk cartridge main body 201c and accordingly, when the label region is provided, for example, on the upper face of the disk holder 205, the label region is concealed. However, by providing the label region 32 on the front face of the disk holder 205 as in the invention, the user can easily confirm information of the disk.

Figure 15F:
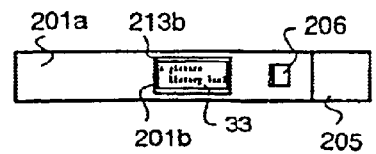

Further, an explanation will be given of further embodiment in reference to FIG. 15F. FIG. 15F shows a view viewing the disk cartridge 217a from an arrow mark B direction in FIG. 13. According to the invention, there is provided a constitution in which a hole 201b in a window-like shape is opened on a side face of the disk cartridge 217a and a side face portion of a holder arm 213b can be seen. Further, a label region 33 is provided at the side face portion of the holder arm 213b and by arbitrarily writing information to the region by the user, information of the disk 4 can easily be determined. Further, there may be constructed a structure in which a transparent sheet member is pasted on the hole 201b in a window-like shape such that dust or dirt is prevented from invading from outside to inside of the disk cartridge and the label region 33 can be recognized.

As has been explained above in reference to FIG. 13A through FIG. 15E, when the label region 30, 32 and 33 are present in the disk holder 205, the label regions are installed on the upper face and/or the front face and/or the side face of the holder arm 213 portion integrally constituted with the disk holder 205 and in that case, the constitution may be dealt with by forming a shape in which a hole is opened in a window-like shape at a portion of the disk cartridge main body such that the label region can be confirmed when the disk holder is attached to the disk cartridge main body 201a or 201c and a similar effect can be achieved.

When the label regions 30, 32 and 33 are used in this way, for example, file name, software name, controller, date, information by bar codes and so on of data written to a disk can freely be written or erased such that the user can easily use it. The user may describe necessary content to the label regions 30, 32 and 33 directly by a writing instrument such as a "felt-tip pen" or the like or may form the paper label 31 or the like separately as mentioned above and thereafter may paste it on the label region 30 and/or the label region 32 and/or the label region 33. Thereby, the disk holder 205 can be used similar to a paper label generally pasting on a floppy disk or the like, the user can easily determine the disk and accordingly, easiness of use is significantly promoted.

Figure 16:
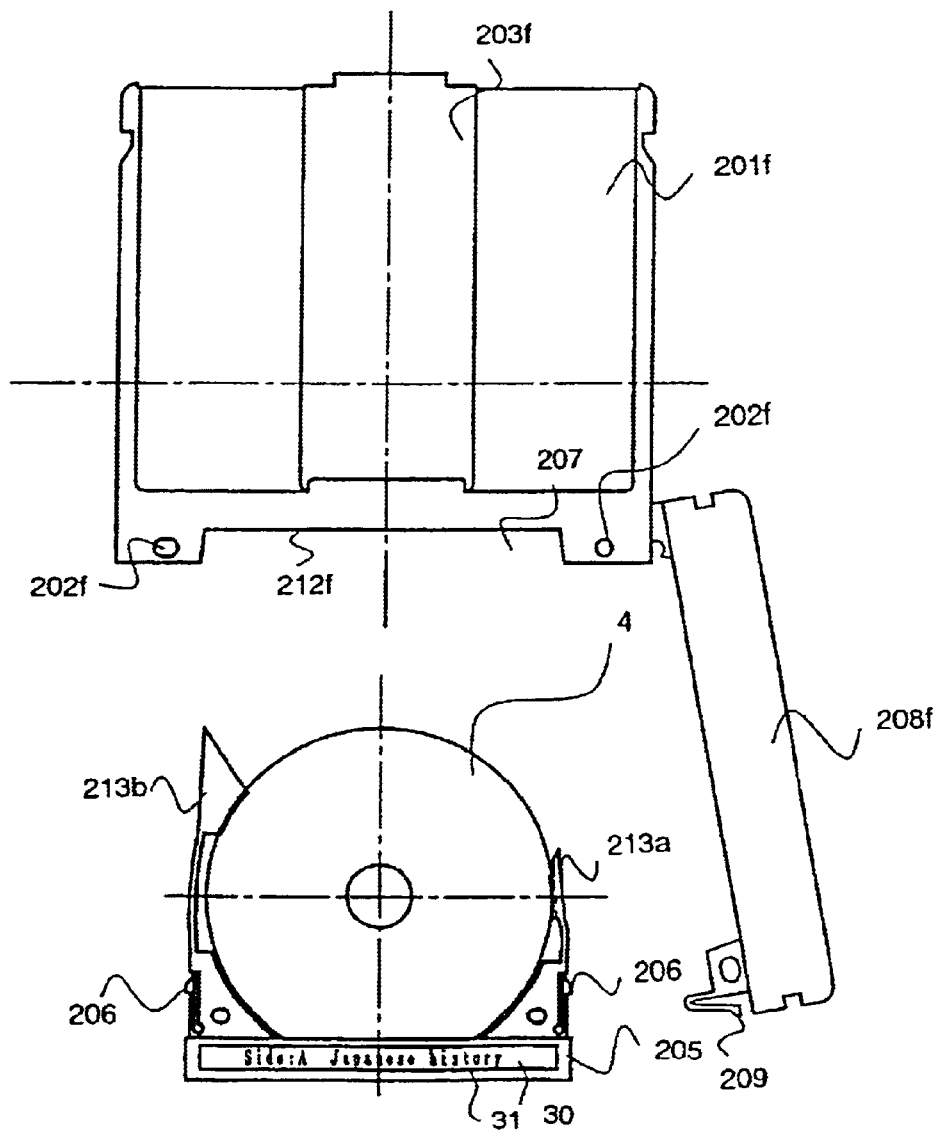
FIG. 16 is a view showing an embodiment of the invention and an upper view showing a behavior of mounting a disk holder to a disk cartridge having different shape and size.

Successively, an explanation will be given of an embodiment when the disk holder 205 is attached to other disk cartridge main body in reference to FIG. 16 and FIG. 17. FIG. 16 is a view showing the shape of a disk cartridge main body 201f having shape and size different from those of the disk cartridge main body 201a of FIG. 13. The disk cartridge main body 201f is a disk cartridge larger than the disk cartridge main body 201a. A shutter 203f similar to that of the disk cartridge main body 201a is arranged at the disk cartridge main body 201f. A disk insertion and detachment port 212f for inserting and detaching the disk holder 205 is provided at a portion opposed to a position at which the shutter 203f is arranged and can be opened and closed by a disk insertion and detachment port opening and closing member 208f. The disk insertion and detachment portion opening and closing member 208f is locked by a locking claw 209 and can be opened by releasing the locking by disengaging the locking claw 209. The disk 4 is moved by inserting the disk holder 205 holding the disk 4 into the disk insertion and detachment port 212f and closing the disk insertion and detachment port opening and closing member 201f and by the operation, the movement of the disk 4 into the disk cartridge main body 201f is completed with no direct touch with the disk 4. Further, a notch 207 penetrating the inside of the disk cartridge is installed at a vicinity of the disk insertion and detachment port 212f. Further, the label region 30 is provided in the disk holder 205 and the user freely writes information concerning the disk or describes information necessary for the disk 4 to the label 31 and pastes it.

Figure 17:
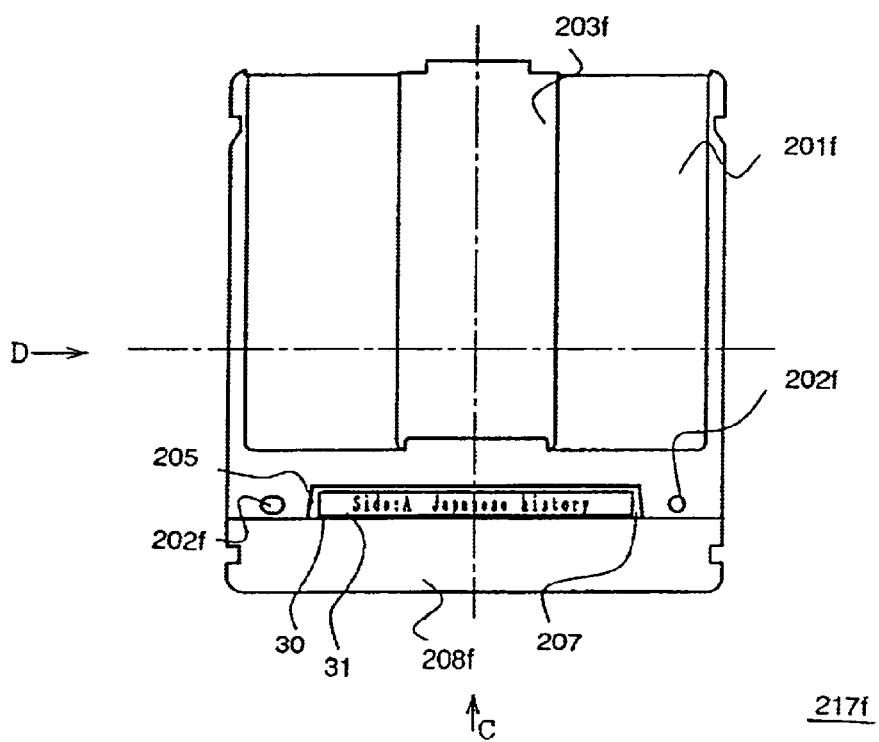
FIG. 17 is a view showing the embodiment of the invention and an upper view in which a disk holder is mounted to the disk cartridge having different shape and size.

FIG. 17 is a view showing a state in which the disk 4 is attached to the disk cartridge main body 201f. In this case, the label region 30 installed to the disk holder 205 is exposed to the outside of the disk cartridge via the notch 207 installed to the disk cartridge main body 201f and the user can easily confirm content of the disk 4 by information of the label region 30.

Further, in the invention, so far as the disk cartridge main body 201f is provided with shape and/or material by which the label region on the disk holder 205 can be seen when the disk holder 205 is attached thereto, shape, size and position of the notched portion are not particularly prescribed. Further, there may be constructed any constitution whereby the label region can be confirmed by forming a shape in which a hole in a window-like shape substituting for the notched portion of the disk cartridge is provided at the disk cartridge main body 201f and pasting a transparent sheet on the hole in a window-like shape.

Successively, an explanation will be given of further embodiment in reference to FIGS. 18A and 18B.

Figure 18A:
FIGS. 18A and 18B are views showing an embodiment of the invention and explanatory views in which a disk holder is mounted to a disk cartridge having different shape and size.

FIG. 18A shows a view viewing FIG. 17 from an arrow mark C direction after opening the disk insertion and detachment port opening and closing member 208f. Further, the disk insertion and detachment port opening and closing member 208f is omitted for simplification. Also in this case, by providing the label region 32 on the front face of the disk holder 205, by only opening the disk insertion and detachment port member 208f without taking out the disk 4 from the disk cartridge 201f, the content of the disk 4 can easily be recognized by information described in the label region 32.

Figure 18B:
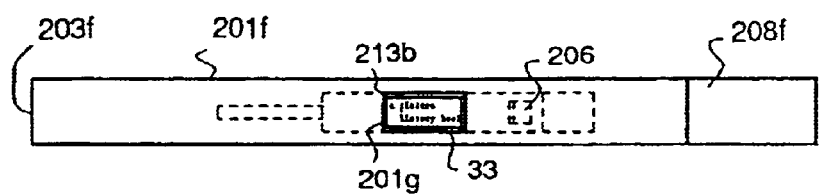

Further, FIG. 18B shows a view viewing a disk cartridge 217f in FIG. 17 from an arrow mark D direction. According to the invention, there is constructed a constitution in which a hole 201g in a window-like shape is opened at a side face of the disk cartridge 217f and the side face of a holder arm 213b can be seen. Further, the label region 33 is provided at the side face portion of the holder arm 213b and by arbitrarily writing information by the user by using the region, information of the disk 4 can easily be determined. Further, there may be constituted a structure in which a transparent sheet member is pasted on the hole 201g in a window-like shape such that dust or dirt can be prevented from invading from outside to inside of the disk cartridge and the label region 33 can be recognized.

Successively, an explanation will be given of further embodiment in reference to FIGS. 19A, 19B, 19C, 19D and 19E.

According to the invention, a recess portion is provided at a label region and/or a region capable of pasting a label.

Figure 19A:
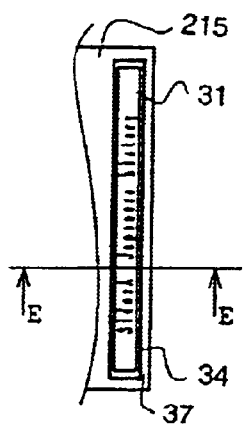
FIGS. 19A, 19B, 19C, 19D and 19E are views showing an embodiment of the invention and explanatory views showing stepped differences of a label region of a disk holder.
Figure 19B:
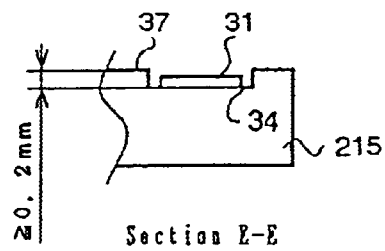

FIG. 19A is an upper view of a disk holder 215 and FIG. 19B is a sectional view taken from a line E—E of FIG. 19A. According to the example of the invention, a label region and/or a region capable of pasting a label is provided on the upper face of the disk holder.

Although the constitution and the function of the disk holder 215 are substantially the same as those of the above-described disk holder 205, a label region and/or a region 34 capable of pasting a label is formed in a shape recessed by 0.2 mm or more from a face 37 where the regions are provided. When the label 31 is, for example, a paper label, the thickness is about 0.1 through 0.2 mm and accordingly, even when the paper label is pasted on the label region and/or the region 34 capable of pasting a label, the label 31 is not raised in a projected shape in contrast to the face 37 having the label region. Hence, even when the disk holder 215 is locked to a disk cartridge main body, not illustrated, dimensions of outer configuration of the disk cartridge are not changed and accordingly, it can be mounted to a recording and/or reproducing device with no hazard. Further, although according to the embodiment, the label region and/or the region capable of pasting a label is constituted to provide on the upper face of the disk holder 215, it may be provided on the lower face in accordance with necessity of the user or may be constituted to provide on both faces of upper and lower faces.

Figure 19C:
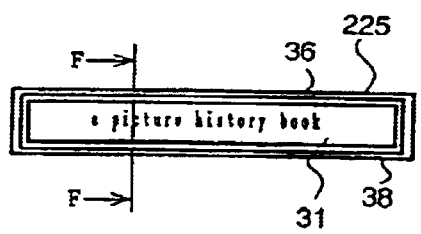
Figure 19D:
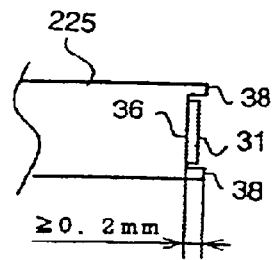

Further, FIG. 19C is a front view of a disk holder 225 and FIG. 19D is a sectional view taken from a line F—F of FIG. 19C. According to the example of the invention, a label region and/or a region 36 capable of pasting a label is constituted to provide on the front face of the disk holder. Although the constitution and the function of the disk holder 225 are substantially the same as those of the above-described disk holder 205, the label region and/or the region 36 capable of pasting a label is formed in a shape recessed by 0.2 mm or more from a face 38 where the regions are provided. When the label 31 is, for example, a paper label, the thickness is about 0.1 through 0.2 mm and accordingly, even when the paper label is pasted on the label region and/or the region 36 capable of pasting a label, the label 31 is not raised in a projected shape in contrast to the face 38 having the label region. Therefore, even when the disk holder 225 is locked by the disk cartridge main body, not illustrated, dimension of outer configuration of the disk cartridge is not changed and accordingly, the disk holder 225 can be mounted with no hazard to a recording and/or reproducing device.

Figure 19E:
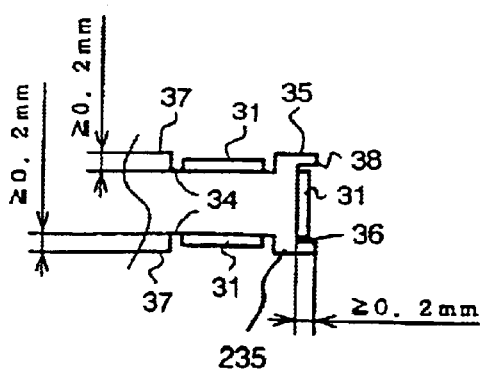
Figure 20:
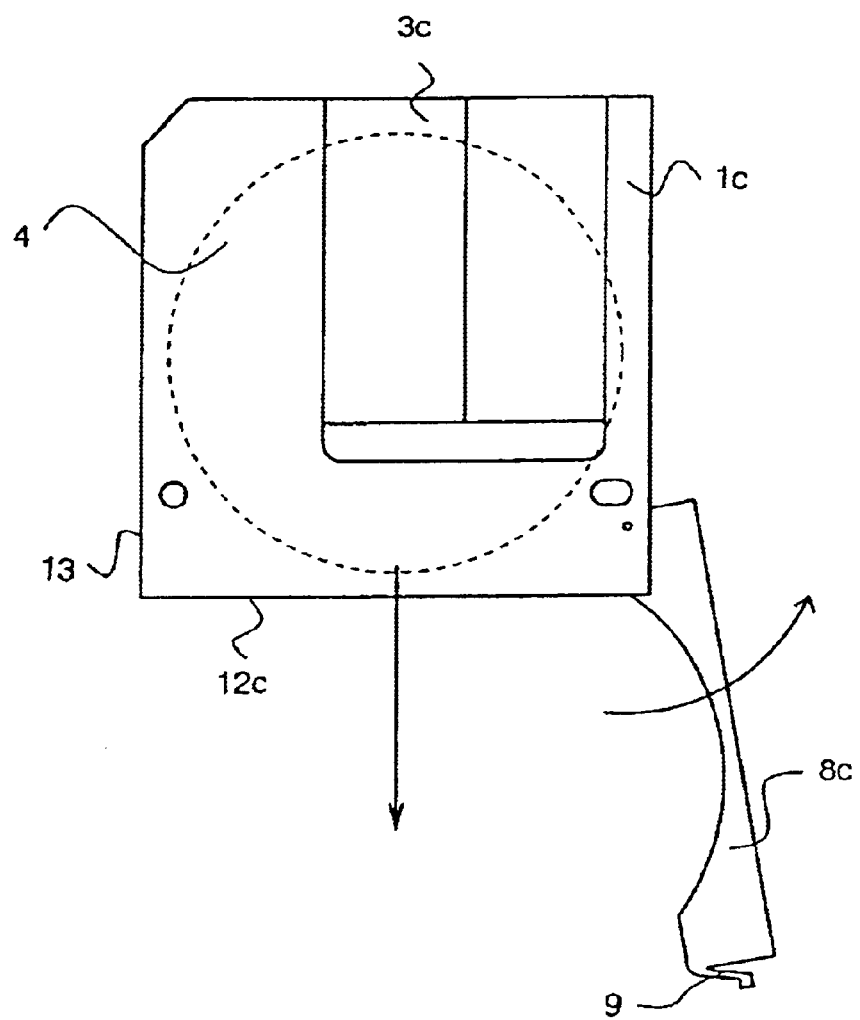
FIG. 20 is a view explaining a conventional disk cartridge which is a disk cartridge having a disk insertion and detachment port for exchanging a disk.

Further, FIG. 19E is a side sectional view of an outline of a disk holder 235. The constitution and the function of the disk holder 235 are substantially the same as those of the above-described disk holder 205 and accordingly, an explanation thereof will be omitted. In this case, label regions and/or the regions 34 and 36 capable of pasting labels are provided on upper faces and a front face of the disk holder 235. Further, the label regions and/or the regions 34 and 36 capable of pasting labels are formed in shapes recessed by 0.2 mm or more in contrast to the faces 37 and 38 where the regions are installed.

An effect thereof is similar to those explained in reference to the above-described FIGS. 19A, 19B, 19C and 19D and accordingly, an explanation thereof will be omitted.

Further, the recess portions of the regions may be provided at a holder arm portion integrally constituted with the disk holder portion, or may be constituted to provide on side faces of the disk holders or side faces of the holder arms by which a similar effect can be achieved.

Although as mentioned above, an explanation has been given of various embodiments, it is commonly constituted that a region representing information of a disk is provided at a disk holder and a disk is moved along with the disk holder and in any cases, there is achieved an effect capable of determining easily the disk by previously writing information of the disk directly to a label region arbitrarily by the user and/or pasting information at the region.

By providing a region representing information of a disk at a disk holder, when the disk is moved between disk cartridges, the disk information held by the disk holder can simultaneously be moved and even when the disk enters a disk cartridge, the content of the disk can easily be confirmed via the disk holder.

Further, the content of the disk can also be written to or erase from a label region arbitrarily by the user and accordingly, easiness of use can significantly be promoted.

What is claimed is:

1. A disk cartridge incorporating a disk-shaped recording medium and having an opening portion for carrying out recording and/or reproducing operation by a recording and/or reproducing device:

wherein the opening portion is closed such that the disk-shaped recording medium is shielded from outside by a shutter arranged at the disk cartridge when the disk cartridge is outside of the recording and/or reproducing device;

wherein when the disk cartridge is inside of the recording and/or reproducing device, the shutter is moved and the opening portion is opened such that the recording and/or reproducing device can carry out reproducing or recording operation from or to the disk-shaped recording medium;

wherein a disk holder is arranged at the disk cartridge;

wherein the disk holder is constituted by a structure capable of detaching from a disk cartridge main body;

wherein the disk holder can be mounted to the disk cartridge main body along with the disk-shaped recording medium;

wherein the disk holder is constituted by a structure capable of being detached to outside of the disk cartridge main body along with the disk-shaped recording medium, the disk holder including a pair of resilient and deformable disk holding members which engage an outer periphery of the disk-shaped recording medium so as to hold the disk-shaped recording medium independent of any orientation of the disk holder and the disk-shaped recording medium when the disk holder is detached outside of the disk cartridge; and wherein the disk holder holds information in respect of the disk-shaped recording medium.

2. The disk cartridge according to claim 1:

wherein in different recording and/or reproducing devices, the same disk-shaped recording medium is used by being contained in one disk cartridge having a different shape and/or size from at least another disk cartridge;

wherein when the disk-shaped recording medium is moved between the one disk cartridge and the at least another disk cartridge having the different shapes and/or sizes, the disk-shaped recording medium is moved along with the disk holder; and wherein when the disk-shaped recording medium is moved to the one disk cartridge and the at least another disk cartridge having the different shapes and/or sizes, the information in respect of the disk-shaped recording medium held by the disk holder can be read by the recording and/or reproducing devices.

3. The disk cartridge according to claim 1:

wherein the information in respect of the disk-shaped recording medium of the disk holder can be detected from at least two directions.

4. The disk cartridge according to claim 3:

wherein the information in respect of the disk-shaped recording medium of the disk holder is identified by presence or absence of notches at least over two faces of the disk cartridge.

5. The disk cartridge according to claim 1, wherein the pair of resilient and deformable disk holding members engage the outer periphery of the disk-shaped recording medium at least at a position disposed inwardly of the center of the disk-shaped recording medium in an insertion direction of the disk holder into the disk cartridge.

6. The disk cartridge according to claim 1, wherein the pair of resilient and deformable disk holding members have end portions in which the distance between the end portions is narrower than the diameter of the disk-shaped recording medium for holding the outer periphery of the disk-shaped recording medium at a position inwardly than a center of the disk-shaped recording medium in a direction of insertion into the disk cartridge.

\* \* \* \* \*